United States Patent
Dinnage et al.

(10) Patent No.: US 10,969,126 B2
(45) Date of Patent: *Apr. 6, 2021

(54) DIRECT EVAPORATIVE COOLING SYSTEM WITH PRECISE TEMPERATURE CONTROL

(71) Applicant: Munters Corporation, Selma, TX (US)

(72) Inventors: Paul A. Dinnage, New Braunfels, TX (US); Daniel Unge, Skarpnack (SE); Anders Nelson, Sollentuna (SE)

(73) Assignee: Munters Corporation, Selma, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,456

(22) Filed: Dec. 3, 2018

(65) Prior Publication Data

US 2019/0101300 A1  Apr. 4, 2019

Related U.S. Application Data

(63) Continuation of application No. 15/589,279, filed on May 8, 2017, now Pat. No. 10,145,572.

(Continued)

(51) Int. Cl.
*F24F 5/00* (2006.01)
*F24F 6/06* (2006.01)
(Continued)

(52) U.S. Cl.
CPC .............. *F24F 5/0035* (2013.01); *F24F 3/14* (2013.01); *F24F 6/06* (2013.01); *F24F 11/30* (2018.01); *F24F 11/74* (2018.01); *F24F 11/79* (2018.01); *F24F 13/12* (2013.01); *F24F 13/14* (2013.01); *F24F 2110/10* (2018.01); *F24F 2110/20* (2018.01)

(58) Field of Classification Search
CPC .. F24F 5/0035; F24F 11/0078; F24F 11/0015; F24F 13/12; F24F 13/14; F24F 3/14
See application file for complete search history.

(56) References Cited

U.S. PATENT DOCUMENTS 3,212,424 A  10/1965  Davis
3,472,042 A  10/1969  Shriver et al.
(Continued)

FOREIGN PATENT DOCUMENTS

CN  1214441 A  4/1999
CN  103502745 A  1/2014
(Continued)

OTHER PUBLICATIONS

International Search Report and Written Opinion dated Jul. 17, 2017, in PCT/US2017/031580.
(Continued)

*Primary Examiner* — Kun Kai Ma
(74) *Attorney, Agent, or Firm* — Venable LLP

(57) ABSTRACT

An air handling system includes a movable evaporative media section. The movable evaporative media section is movable between a closed position and an open position. When the movable evaporative media section is in an open position, the movable evaporative media section exposes an opening to the air flow and is positioned to allow at least a portion of the air flow in the volume to flow around the movable evaporative media section and through the opening.

18 Claims, 10 Drawing Sheets

Related U.S. Application Data

(60) Provisional application No. 62/333,425, filed on May 9, 2016.

(51) Int. Cl.

| | | |
|---|---|---|
| *F24F 11/74* | (2018.01) | |
| *F24F 11/30* | (2018.01) | |
| *F24F 11/79* | (2018.01) | |
| *F24F 3/14* | (2006.01) | |
| *F24F 13/12* | (2006.01) | |
| *F24F 13/14* | (2006.01) | |
| *F24F 110/20* | (2018.01) | |
| *F24F 110/10* | (2018.01) | |

(56) References Cited

U.S. PATENT DOCUMENTS

| | | |
|---|---|---|
| 3,511,337 A | 5/1970 | Pease et al. |
| 3,791,102 A | 2/1974 | Huntington |
| 3,941,091 A | 3/1976 | Fleshman |
| 4,045,523 A | 8/1977 | Geotti |
| 4,284,132 A | 8/1981 | Strand, Sr. |
| 4,407,187 A | 10/1983 | Horney |
| 4,940,475 A | 7/1990 | Yaeger |
| 5,155,936 A | 10/1992 | Johnson |
| 6,085,834 A | 7/2000 | Thomas et al. |
| 6,131,403 A | 10/2000 | Ji |
| 6,302,785 B1 | 10/2001 | McKinney et al. |
| 6,983,788 B2 | 1/2006 | Haglid |
| 8,234,881 B2 | 8/2012 | Yanik et al. |
| 8,943,851 B2 * | 2/2015 | Gerlach .................. F24F 13/15 62/186 |
| 9,752,811 B2 | 9/2017 | Howell |
| 9,769,960 B2 | 9/2017 | LeFebvre et al. |
| 10,145,572 B2 * | 12/2018 | Dinnage .................. F24F 13/12 |
| 2002/0129614 A1 | 9/2002 | Dinnage et al. |
| 2005/0208888 A1 | 9/2005 | Moore et al. |
| 2007/0163280 A1 | 7/2007 | Meerpohl |
| 2008/0022709 A1 | 1/2008 | McKee |
| 2010/0096108 A1 | 4/2010 | Castagne |
| 2010/0311317 A1 | 12/2010 | McReynolds et al. |
| 2011/0174003 A1 | 7/2011 | Wenger |
| 2012/0129443 A1 | 5/2012 | Bastow |
| 2013/0106004 A1 | 5/2013 | Stumphauzer |
| 2013/0111937 A1 | 5/2013 | Hendrix et al. |
| 2013/0213076 A1 | 8/2013 | Gerlach |
| 2013/0233005 A1 | 9/2013 | Gilbert |
| 2015/0069643 A1 | 3/2015 | Mockry et al. |
| 2015/0140922 A1 | 5/2015 | Babur et al. |
| 2015/0204626 A1 | 7/2015 | Martell et al. |
| 2016/0120364 A1 | 5/2016 | De Haas et al. |
| 2017/0138650 A1 | 5/2017 | Eiserer |

FOREIGN PATENT DOCUMENTS

| | | |
|---|---|---|
| CN | 105307547 A | 2/2016 |
| EP | 2368082 | 9/2011 |
| GB | 2519308 A | 4/2015 |
| WO | 2010/075358 A1 | 7/2010 |

OTHER PUBLICATIONS

"Product Sheet FA6 Evaporative humidifier," Munters AB, 2015.
"Evaporative Humidifier/Cooler FA6 for AHU's Technical Manual," HC/MMA/TGB-1711-06/10, Munters Europe AB, 2010.
"AUTOdek PBD, Humidification Wet Sections for the Automotive Industry," Munters Corporation, 2000.
Office Action dated Jun. 3, 2020, in Chinese Patent Application No. 201780042398.7.
Search Report dated Apr. 2, 2020, in European Patent Application No. 17796635.5.

* cited by examiner

DIRECT EVAPORATIVE COOLING SYSTEM WITH PRECISE TEMPERATURE CONTROL

CROSS REFERENCE TO RELATED APPLICATION

This application is a continuation of U.S. patent application Ser. No. 15/589,279, filed May 8, 2017. U.S. patent application Ser. No. 15/589,279 claims the benefit under 35 U.S.C. § 119(e) of U.S. Provisional Patent Application No. 62/333,425, filed May 9, 2016, and titled "Direct Evaporative Cooling System with Precise Temperature Control." The forgoing applications are incorporated herein by reference in their entireties.

FIELD OF THE INVENTION

This invention relates to air handling systems and systems and methods to control them. In particular, this invention relates to evaporative cooling or humidifying systems for air handling units. A particularly suitable application, for example, is data center cooling systems.

BACKGROUND OF THE INVENTION

Evaporative cooling systems, which are also sometimes referred to as evaporative humidifiers because they both cool air and humidify air, are increasingly being used for data center cooling, among other applications in air-handling systems within both residential and industrial buildings. It is desirable that these evaporative cooling systems provide precise temperature control with the lowest pressure drop possible so as to minimize fan power consumption.

One such system is the FA6™ evaporative humidifier/cooler manufactured by Munters Corporation. The FA6™ evaporative humidifier/cooler is described in a Munters publication entitled "Evaporative Humidifier/Cooler FA for AHU's Technical Manual" and numbered HC/MMA/TGB-1711-06/10, the disclosure of which is incorporated herein by reference in its entirety. In an evaporative cooling system 100, as shown in FIG. 1, for example, water is supplied to the top of evaporative media 102 by a distribution header 104. The water flows down the surfaces (typically corrugated) of the evaporative media 102, and warm, dry air (input air 112) is directed across the evaporative media 102 to an upstream face 106 of the evaporative media 102. As the warm, dry air (input air 112) passes through the evaporative media 102, it evaporates a portion of the water. The energy used for evaporation is drawn from the input air 112 itself, resulting in cool, humidified air (output air 114) leaving the downstream face of the evaporative media 102.

When wetted, a given evaporative media 102 geometry and air flow rate will provide a set evaporation efficiency. This efficiency can be calculated as the Wet Bulb Depression Efficiency (WBDE) defined as the degree of cooling of the air from dry bulb temperature (DBT) to its wet bulb temperature (WBT) measured in percent efficiency. When the evaporative media 102 is dry, the efficiency is zero, and no cooling is accomplished. It is not practical to have the evaporative media 102 partially wetted as repeated wet/dry cycling leaves behind scale from the water each time it is dried. Repeated wet/dry cycles are also detrimental to media life. When water is first flowed over the evaporative media 102, full cooling is seen within minutes. When water flow is halted, however, the cooling effect remains while the water absorbed in the body of the evaporative media 102 evaporates. This time varies based on a large number of variables including the air velocity, DBT, WBT and media type, as different media geometries and compositions hold differing amounts of absorbed water. Typically, it may take 20 minutes or longer for the evaporative media 102 to completely dry and lose its cooling capability after water flow is terminated.

It is often important to provide cooled or humidified output air 114 at a desired set point. This cannot be accomplished with a simple wetted evaporative media 102 alone. Even ignoring the transition period from dry to wet or wet to dry, either the input air 112 is cooled to the temperature defined by the properties of the input air 112 (e.g., temperature and humidity) and media efficiency, or the input air 112 is not cooled at all. Unless the set point is one of these values, then the output air 114 will not be cooled to the required set point. As a result, various methods and systems have been suggested to control the evaporative cooling system 100 to regulate the temperature and humidity of the output air 114.

The simplest form of control is to arrange the evaporative media 102 in individual banks with separate water distribution systems. Water flow is controlled by pumps or valves to wet only the number of banks required to provide the desired cooling. By mixing the cool air off the wetted media with the warmer air from the non-wetted media, a blend temperature can be achieved close to the desired temperature set point. Since the evaporative media 102 initiates cooling quickly after being wetted, the system responds to the requirement for increased cooling rather quickly, but it is slow to reduce the amount of cooling as the media remains wet for an extended period of time after water flow is terminated (as discussed above). In addition, this method of control provides only discrete changes to the cooling capacity based on turning on or off an individual bank. As a result, this method does not provide continually variable cooling control.

Another way to regulate the temperature and humidity of the output air 114 is through the use of bypass or face and bypass control. An evaporative cooling system 200 using face and bypass control is shown in FIG. 2. In this system 200, a series of individual evaporative units 210, 220, 230, 240 are aligned in a plane with a bypass section 250. Each individual unit 210, 220, 230, 240 (also referred to herein as a cassette, and described in the FA6 manual identified above) includes evaporative media and a water distribution header 212, 222, 232, 242. In the system shown, a portion of the cassettes 220, 230, 240 may be selectively used. A solenoid valve 224, 234, 244 may be opened to allow water to flow to the corresponding distribution header 222, 232, 242 and selectively turn on the evaporative cooling capability of the cassettes 220, 230, 240. A bypass damper 252 is used to open or block, selectively and variably, the bypass section 250 and an optional face damper 214 is used to block or open flow, selectively and variably, to at least one of the cassettes 210.

In the evaporative cooling system 200 using face and bypass control, the temperature and humidity are controlled by varying the distribution of air (input air 262) that flows through the cassettes 210, 220, 230, 240 and through the bypass 250. The warmer, dryer air that flows through the bypass 250 (bypass air 264) is mixed with the cooler, more humid air that flows through the cassettes 210, 220, 230, 240 (conditioned air 266). The desired temperature and humidity of output air 268 can be achieved by varying the ratio of bypass air 262 to the conditioned air 264 (blend ratio). For example, the amount that the face damper 214 and bypass damper 252 are opened is adjusted to achieve the desired blend ratio of the output air 268, and the necessary number of solenoid valves 224, 234, 244 are opened to supply water to the desired cassettes 210, 220, 230, 240.

Face and bypass control does allow continually variable cooling control and has a rapid response to changes in desired temperature. There are several detriments, however, with face and bypass control. The dampers 214, 252 and bypass 250 take up physical cross-sectional space in the air handling system, thus reducing the area available for the evaporative media, and resulting in a higher media face velocity. The increase in velocity will result in an increased pressure drop and thus will create a demand for more fan power to overcome the resistance. The face damper 214 may cause high-velocity channeling when partially open. These higher velocity "jets" may disrupt the water flow in the channels of the evaporative media and can cause water to blow off the downstream face of the evaporative media. For this reason, the face damper 214 is often not included, and the less precise control of only a bypass damper 252 is accepted.

Another deficiency of face and bypass control is stratification of the output air 268. As a result, the output air 268 does not reach the desired temperature condition because the hotter air flowing through the bypass 250 is in a separate layer that is dimensionally separated from the cooler air flowing through the cassettes 210, 220, 230, 240. This deficiency is of great concern in data center cooling, where coolers are closely coupled to server aisles, and there is little opportunity for air blending between the cooling system exit and the server air entrances. Adding multiple bypass 250 sections may help mitigate this detriment; however, this approach adds cost, further reduces the plenum area available for the cooling media, and further increases the fan power requirement.

An adaptation of the face and bypass system that is designed to mitigate the effects of the air "jets" problem noted above, while providing consistent system air pressure drop, is described in U.S. Pat. No. 6,085,834.

Further improved control for evaporative cooling systems, particularly for data center cooling applications, is desired

SUMMARY OF THE INVENTION

In one aspect, the present invention relates to an air handling system that includes an enclosed volume through which air is capable of flowing in an air flow direction, and a movable evaporative media section. The movable evaporative media section is positioned within the volume and is movable between a closed position and an open position. When the movable evaporative media section is in the open position, the movable evaporative media section exposes an opening directly to the air flow and is positioned to allow at least a portion of the air flow in the volume to flow around the movable evaporative media sections and through the opening.

In another aspect, the invention relates to an air handling system that includes an enclosed volume through which air is capable of flowing in an air flow direction, a plurality of evaporative media sections aligned in a direction that is transverse to the air flow direction, and at least one movable evaporative media section. The plurality of evaporative media sections has an opening between a first one of the plurality of evaporative media sections and a second one of the plurality of evaporative media sections. The movable evaporative media section is movable between a closed and an open position. When the movable evaporative media section is in the open position, the movable evaporative media section is positioned to allow at least a portion of the air flow in the volume to flow around the movable evaporative media section and flow through the opening.

In a further aspect, the invention relates to a method of controlling an air handling system. The method includes supplying air to a volume containing a first and second movable evaporative cooling media; flowing water over surfaces of the first evaporative cooling media; directing a portion of the supplied air over the surfaces of the first evaporative cooling media; directing another portion of the supplied air through an opening and selectively around the second evaporative media section; combining the portion of the air flowing through the first evaporative cooling media with the portion of air flowing through the opening; and selectively positioning the second evaporative media section to regulate the portion of the air flowing through the opening and around the second evaporative media section.

These and other aspects, objects, features, and advantages of the invention will become apparent from the following detailed description of illustrative embodiments thereof, which is to be read in connection with the accompanying drawings.

DETAILED DESCRIPTION OF THE PREFERRED EMBODIMENTS

Figure 1:
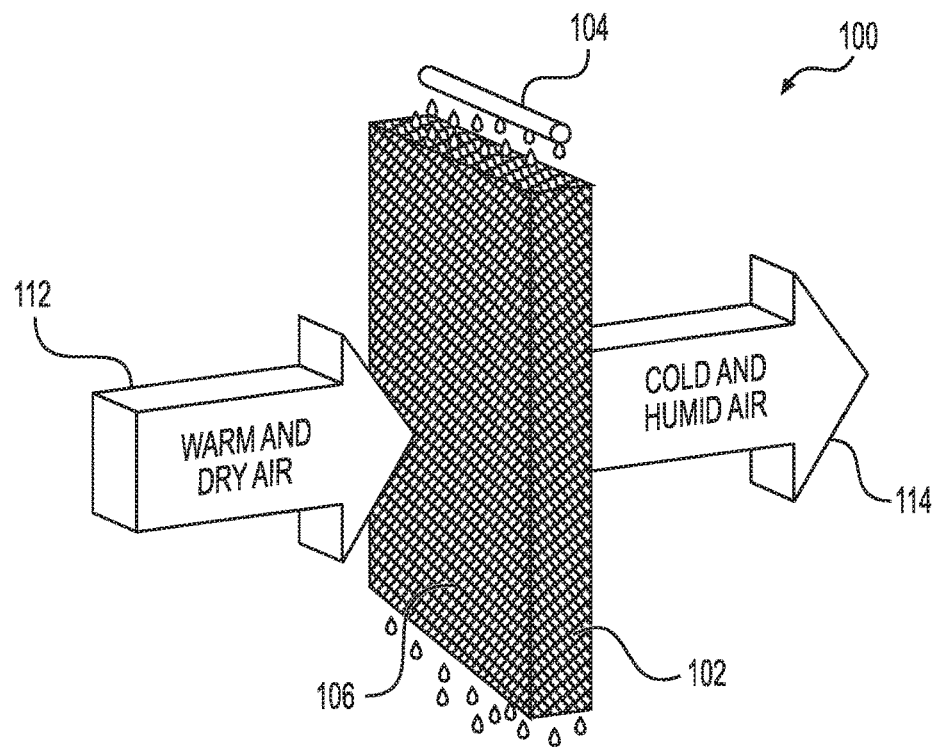
FIG. 1 shows a general evaporative cooling system.
Figure 2:
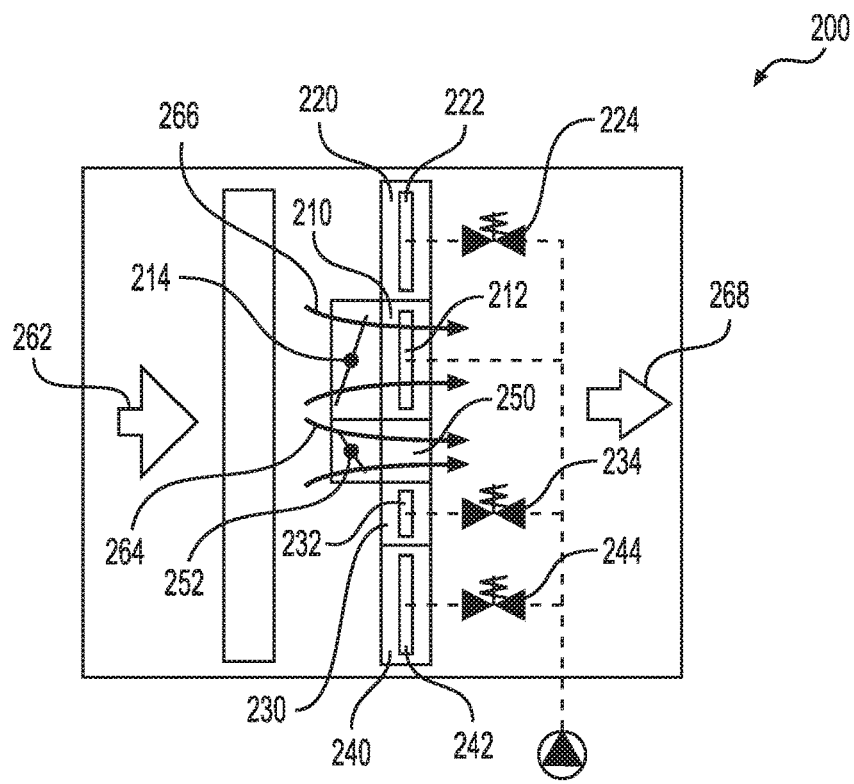
FIG. 2 shows an evaporative cooling system using face and bypass control.
Figures 3, 4, 5:
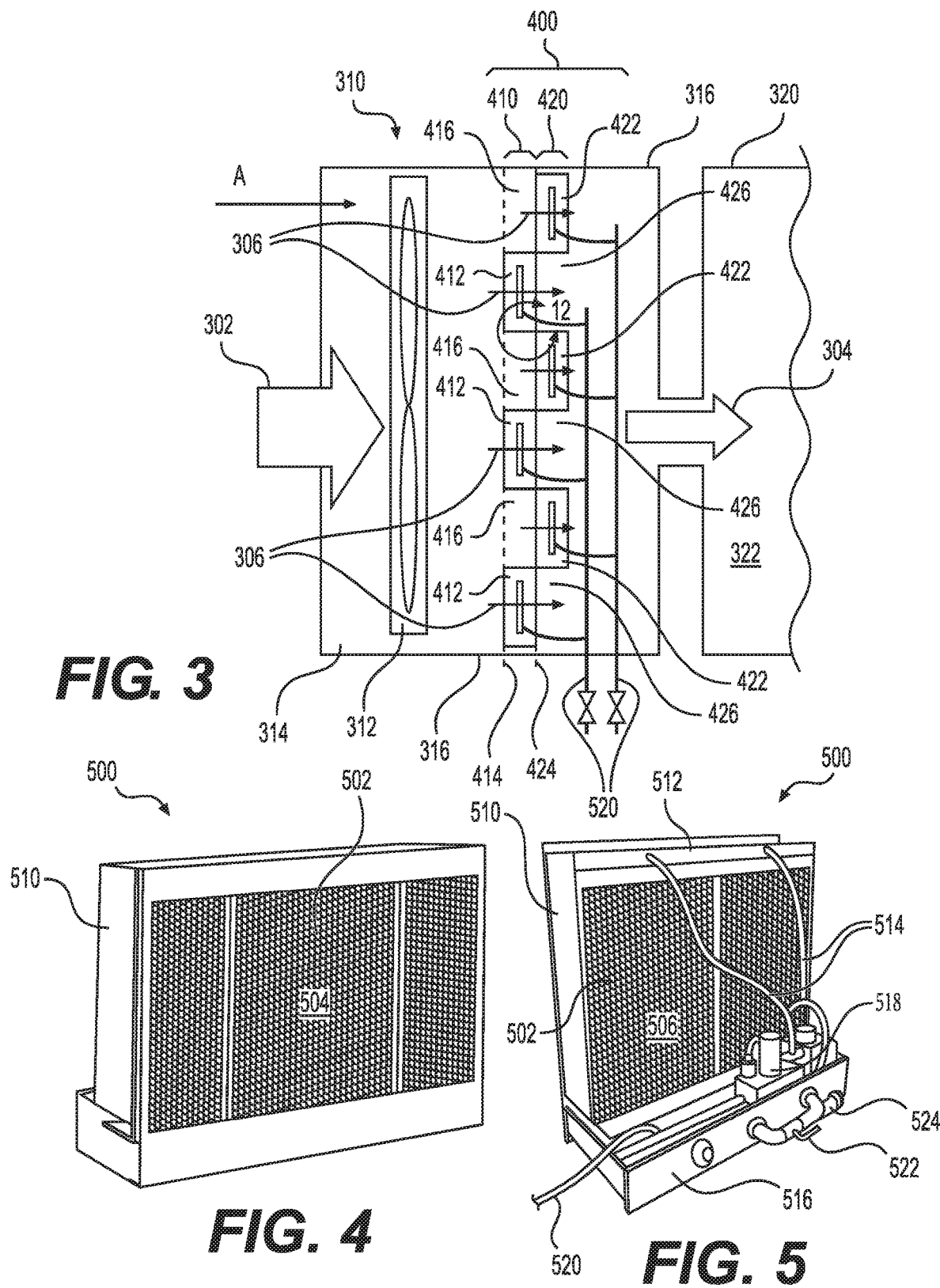
FIG. 3 is top plan view of an air handling system according to a preferred embodiment of the invention.
FIG. 4 is a front isometric view of an evaporative media section that may be used in the air handling system shown in FIG. 3.
FIG. 5 is a rear isometric view of an evaporative media section that may be used in the air handling system shown in FIG. 3.

FIG. 3 is a schematic illustration of an air handling system 310 according to a preferred embodiment of the invention. Air to be cooled and/or humidified (input air 302) is driven across an evaporative cooling system 400. This input air 302, particularly in data center cooling, is typically outside atmospheric air or return air (also called process air) from the enclosure or building to be cooled.

After being cooled in the evaporative cooler 400, the air is supplied (supply air 304) into a room 322 of a building 320 coupled to the air handling system 310. The input air 302 is driven across the evaporative cooling system 400 using any suitable means, including, for example, a fan 312. The evaporative cooling system 400 may be used as part of the air handling system 310 with additional components not shown in FIG. 3. For example, the evaporative cooling system 400 may be used in an air handling system which includes dehumidification equipment, such as a desiccant wheels, or direct expansion refrigerant systems positioned upstream or downstream of the evaporative cooling system 400. Although this invention is described in reference to an air handling system 310 coupled to a building 320, the invention is applicable to any evaporative cooling or humidification application using structured evaporative media including, for example, environmental control for agricultural buildings used to house animals such as pigs, chickens, and turkeys.

The evaporative cooling system 400 includes evaporative media sections 412 in a first set 410 and evaporative media sections 422 in a second set 420. In this embodiment, the evaporative media sections 412, 422 are direct evaporative cooling sections. The evaporative media sections 412, 422 may also be referred to as media blocks or cassettes. Each set 410, 420 includes at least one evaporative media section 412, 422. FIG. 4 shows a front isometric view of a cassette 500 that may be used as one of the evaporative media sections 412, 422, and FIG. 5 shows a rear isometric view of the cassette 500. Each cassette 500 includes evaporative media 502 that is housed within a frame 510. The evaporative media 502 may be a cross-corrugated structural fill material made from cellulose or, if flame resistance is desired, glass fiber. Any suitable evaporative media 502 may be used, including, for example, the evaporative media sold under the trademarks CELdek® and GLASdek® by Munters Corporation.

Water is supplied to a distribution header 512 by a supply line 514 and evenly distributed over the top of the evaporative media 502. The water flows down the surfaces of the evaporative media 502, and warm process air (input air 302) is directed across the evaporative media 502 through the upstream face 504 of the evaporative media 502. The cross-corrugated structure of the evaporative media 502 provides a means for both air and water to pass through the evaporative media 502, generally with water moving vertically downward through the evaporative media 502 while in contact with the process air, which is generally moving horizontally through the evaporative media 502. The open structure of the evaporative media 502 provides a low air pressure drop, generally below 0.5 inches of water (125 Pa), while the tortuous air path around the corrugations provide effective contact area between the air and the wetted surface. As the input air 302 passes through the evaporative media 502, it evaporates a portion of the water. The energy used for evaporation is drawn from the input air 302 itself, resulting in cool, humidified air (conditioned air 306) leaving the downstream face 506 of the evaporative media 502. The surfaces of the evaporative media 502 are continuously wetted with a water flow rate from the distribution header 512 that is multiple times the evaporation rate, and the non-evaporated water flowing out of the bottom of the media is collected in a reservoir 516.

The cassette 500 shown in FIGS. 4 and 5 is depicted as a recirculation type system. In a recirculation type system, the collected water is recirculated to the header 512 through the supply line(s) 514 using a pump 518. Because water is naturally lost during the evaporation process, makeup (supply) water may be added to reservoir 516 by a makeup supply line 520. The reservoir 516 may be drained by opening a drain valve 522 and allowing water to flow through a drain line 524 when desired, such as when the concentration of dissolved solids in the water reaches an undesirable level. Other suitable cassettes 500 may be used instead of the recirculation type system depicted in FIGS. 4 and 5. For example, the cassette 500 may be a direct system where the supply line 520 supplies water directly to the header 512, and then water is continually drained from the reservoir 516 using the drain line 524.

Other suitable designs for the evaporative media sections 412, 422 may also be appropriate. For example, instead of each evaporative media sections 412, 422 having its own isolated reservoir 516, the reservoirs 516 for each evaporative media sections 412, 422 may be interconnected. Alternatively, a single, common reservoir 516 can be used for all of the evaporative media sections 412, 422 or all of the evaporative media sections 412, 422 within a set 410, 420. Although each evaporative media section 412, 422, is shown as a single cassette 500 in FIG. 3, a plurality of cassettes 500 could be combined to operate as each evaporative media section 412, 422.

In the embodiment shown in FIG. 3, the air flows in direction A through a volume 314 that, in plan view, is bounded on two sides by walls 316 and top and bottom walls (not shown). The evaporative media sections 412 in the first set 410 are aligned in a direction that is transverse to the air flow. Preferably, the evaporative media sections 412 are disposed along a first plane 414 that is transverse to the air flow direction A, and even more preferably, the upstream face 504 of each evaporative media section 412 lies in the first plane 414. In this embodiment, the first plane 414 is perpendicular to the air flow across the upstream faces 504 of the evaporative media sections 412.

The evaporative media sections 422 in the second set 420 are also aligned in a direction that is transverse to the air flow. Preferably, the evaporative media sections 422 are disposed along a second plane 424 that is transverse to the air flow direction A, and even more preferably, the upstream face 504 of each evaporative media section 422 lies in the second plane 424. In this embodiment, the second plane 424 (and thus the evaporative media sections 422) are perpendicular to the air flow and parallel to the first plane 414. The evaporative media sections 422 in the second set 420 are offset from the evaporative media sections 412 in the first set 410 in a direction downstream of the first set 410. In the embodiment shown, the downstream face 506 of each evaporative media section 412 lies in the second plane 424.

As a result of the offset spacing of the evaporative media sections 412, 422, the first set 410 of evaporative media sections 412 has at least one opening 416 between adjacent evaporative media sections 412 or between an evaporative media section 412 and one of the walls 316. Likewise, the second set 420 of evaporative media sections 422 has at least one opening 426 between adjacent evaporative media sections 422 or between an evaporative media section 422 and one of the walls 316. Under conditions where all of the evaporative media sections 412, 422 are used to cool and/or humidify the input air 302, the evaporative media sections 412, 422 are positioned as shown in FIG. 3 to collectively span the entire width of the flow volume 314, and all of the input air 302 is directed through all of the evaporative media sections 412, 422. In order to span the entire width of the channel, evaporative media sections 412 in the first set 410 are positioned at the openings 426 in the second set 420 and, likewise, evaporative media sections 422 in the second set 420 are positioned at the openings 416 in the first set 410. The volume 314 is also bounded on top and bottom by walls as discussed above and the evaporative media sections 412, 422 have a height that spans the height of the volume 314. Multiple cassettes 412, 422 may be stacked to span the entire height of the volume 314. In this embodiment, the openings 416, 426 also span the entire height of the volume 314, but the openings 416, 426 may also be shorter than the full height of the volume 314. In addition, the embodiment just described is a horizontal configuration, where, for example, the evaporative media sections 412 and openings 416 (and evaporative media sections 422 and openings 426) alternate along the width of the volume 314. Instead of this horizontal configuration, the evaporative media 412, 422 and openings 416, 426 may be arranged in a vertical configuration where the evaporative media sections 412, 422 and openings 416, 426 are disposed 90 degrees from the configuration shown in FIG. 3.

At least one of the evaporative media sections or cassettes 412, 422 in the sets 410 or 420 is movable. The movable evaporative media sections 412 or 422 are movable from a closed position (shown in FIG. 3 above) to an open position (shown in FIGS. 6, 8, and 9 and discussed further below). When higher temperatures and/or less humidity in the supply air 304 are desired than would otherwise be achieved by passing the input air 302 through all of the evaporative media sections 412, 422, at least one of the evaporative media sections 412 or 422 is moved from its closed position to its open position to allow a portion of the input air or process air 302 to pass through a corresponding opening 416, 426 without passing through the moved evaporative media section 412 or 422. The air passing through the opening 416 or 426 and not flowing through evaporative media sections 412, 422 is referred to herein as bypass air 308. The bypass air, which is warmer and drier than the air flowing through the evaporative media sections 412, 422 (conditioned air 306), is mixed with the conditioned air 306 to achieve the desired temperature and/or humidity in the supply air 304. The ratio of bypass air 308 to the conditioned air 306 is referred to herein as the blend ratio.

Figure 6:
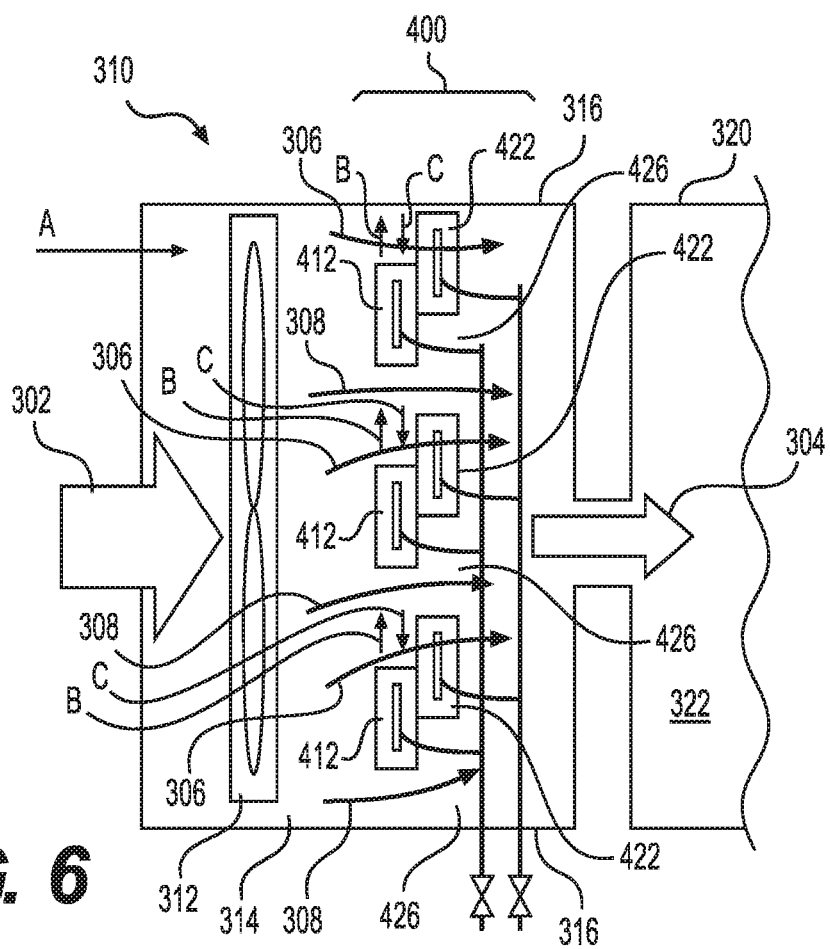
FIG. 6 shows a first embodiment of the air handling system of FIG. 3 with evaporative media sections in an open position.
Figure 8:
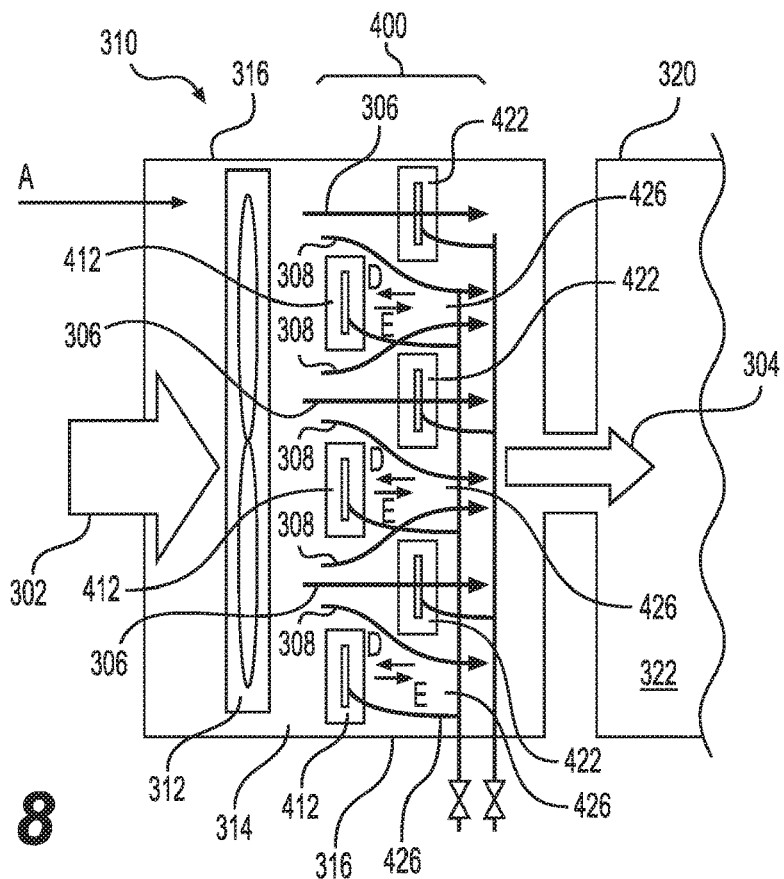
FIG. 8 shows a second embodiment of the air handling system of FIG. 3 with evaporative media sections in an open position.
Figure 9:
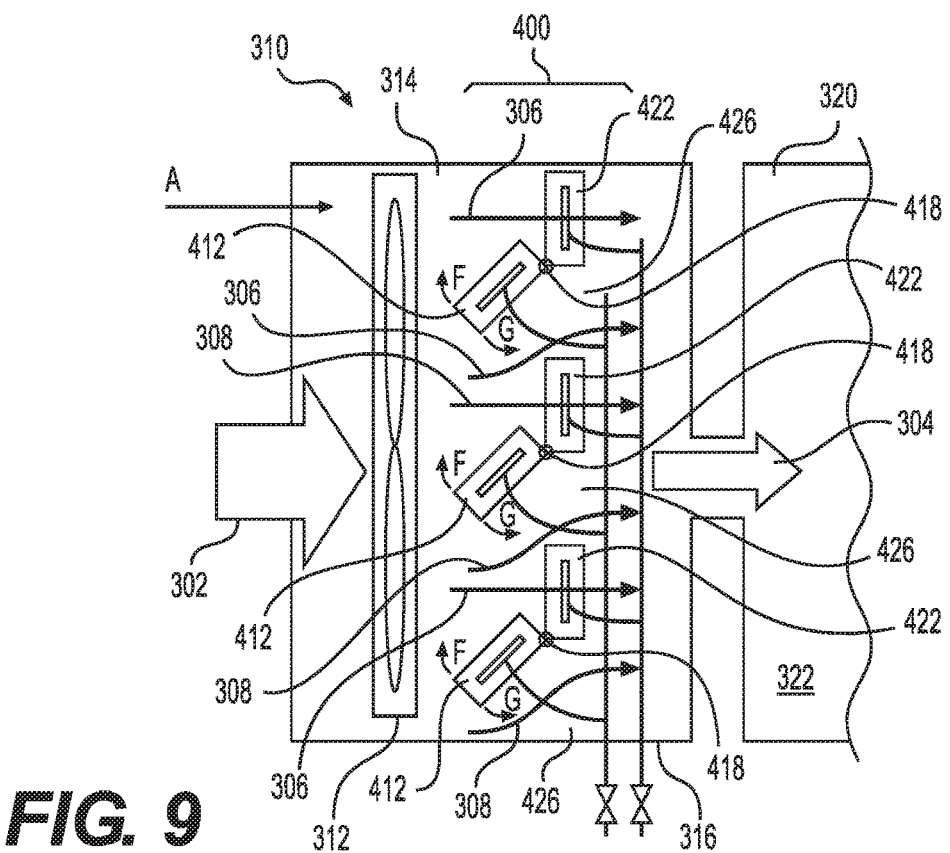
FIG. 9 shows a third embodiment of the air handling system of FIG. 3 with evaporative media sections in an open position.

FIGS. 6, 8, and 9 show three embodiments of how the evaporative media sections 412 of the first set 410 can be moved to allow bypass air 308 to flow around the evaporative media sections 412 of the first set 410 and through the openings 426 in the second set 420. In the embodiment shown in FIG. 6, the evaporative media sections 412 of the first set 410 linearly translate in directions B and C. Directions B and C are transverse to the air flow (direction A) and may be, for example, parallel to the first plane 414 and perpendicular to the air flow direction A. Although directions B and C are shown as directions of movement that are horizontal with respect to the air handling system, lateral movement transverse to the air flow direction A may also include movement in the vertical direction (e.g., up and down). Moving the evaporative media sections 412 in direction B from the closed position exposes a portion of each of the openings 426 in the second set 420, allowing bypass air to flow through the openings 426. Moving the evaporative media sections 412 in direction B further from the closed position will expose more of each of the openings 426 and a greater proportion of the input air 302 will flow through the openings 426 as bypass air 308, instead of flowing through the evaporative media section 422 as conditioned air 306. Conversely, moving the evaporative media sections 412 in direction C from an open position closes the openings 426 in the second set 420 and reduces the proportion of the input air 302 that will flow through the openings 426 as bypass air 308.

The flow of water to each evaporative media section 412, 422 may be controlled independently of moving the movable evaporative media sections 412, and many different suitable combinations for operating the evaporative cooling system 400 are possible. In the following examples the initial condition of the evaporative cooling system 400 is off, all of the movable evaporative media sections 412 being open and no water being supplied to any of the evaporative media sections 412, 422. As cooling is needed, water flow can be initiated from the header 512 for one of the evaporative media sections 412, 422. Then the moveable evaporative media sections 412 are moved in direction C towards the closed position to provide additional cooling. When cooling from one evaporative media section 412, 422 is not sufficient, the movable evaporative media sections 412 can be opened and water flow can be initiated from the header 512 of another one of the evaporative media sections 412, 422. The sequence can be repeated as additional cooling is need. Instead of water flow being initiated from the header 512 of just one of the evaporative media sections 412, 422 at a time, water flow can be initiated from any suitable number of evaporative media sections 412, 422 including pairs of evaporative media sections 412, 422 or even all of the evaporative media sections 412, 422. In another example, the evaporative media sections 412, 422 can be grouped into sets of pairs, one movable evaporative media section 412 and one adjacent, stationary evaporative media section 422. Water flow can be initiated from the headers 512 of one pair. Then, as additional cooling is need, the movable evaporative media section 412 of that pair is moved in direction C toward the closed position. Once the movable evaporative media section 412 of the first pair is closed, water flow can be initiated from the headers 512 of another pair, and the sequence can be repeated for addition cooling.

Figure 7:
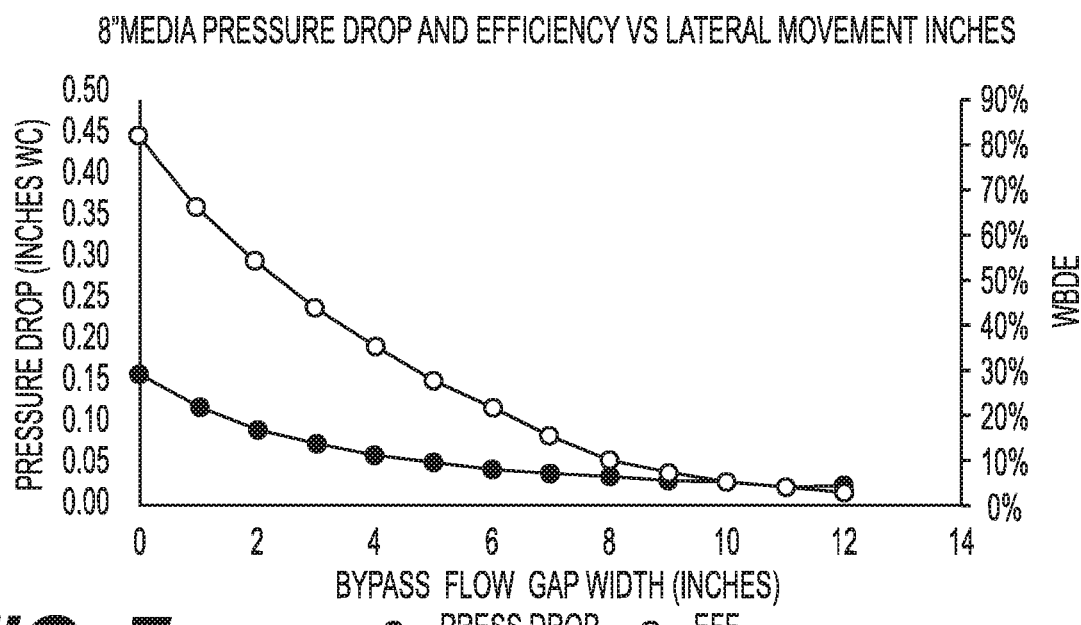
FIG. 7 is a chart of the efficiency and pressure drop as a function of bypass flow gap width of an example of the embodiment shown in FIG. 6.

Performance of the embodiment shown in FIG. 6 is illustrated by an example plotted in chart shown in FIG. 7. In this example, there are two movable evaporative media sections 412 in the first set 410 and two evaporative media sections 422 in the second set 420. Each the upstream face 504 of each evaporative media section 412, 422 is 1 foot wide and 4 feet tall. In total, the four evaporative media sections 412, 422 span a distance of 4 feet (the area of the evaporative media 502 between walls 316). Each evaporative media section 412, 422 has a depth of 8 inches. The fan 312 drives a fixed air flow of 6,400 cubic feet per minute (cfm) through the volume 314.

The two movable evaporative media sections 412 may be moved a distance in direction B from a closed position. Moving the evaporative media sections 412 in direction B exposes a portion of the opening 426. The amount of the opening 426 exposed is referred to herein as a bypass flow gap 432 (see FIGS. 12A and 13A). In this embodiment, the width W of the bypass flow gap 432 for each of the two openings 426 directly corresponds to the distance that each evaporative media 412 has been moved in direction B. The width W of the bypass flow gap 432 is plotted on the x-axis in FIG. 7, where zero inches is the closed position and twelve inches is the fully open position. FIG. 7 plots the air pressure drop (left axis) and cooling efficiencies (right axis) as a function of the width W of the bypass flow gap 432. As can be seen in FIG. 7, both the pressure drop and the cooling efficiency geometrically decreases as the movable evaporative media sections 412 are moved in direction B.

In the embodiment shown in FIG. 8, the evaporative media sections 412 of the first set 410 also linearly translate, but they move in directions D and E. Directions D and E are upstream and downstream, respectively, and, in this embodiment, are parallel to the air flow direction A. Moving the evaporative media sections 412 in direction D from the closed position exposes the openings 426 in the second set 420, allowing bypass air 308 to flow through the openings 426. Conversely, moving the evaporative media sections 412 in direction E from an open position closes the openings 426 in the second set 420.

Instead of linearly translating, the evaporative media sections 412 are movable in any other suitable manner including, for example, by rotating as shown in FIG. 9. The evaporative media sections 412 of the first set 410 rotate in directions F and G about an axis of rotation 418. In this embodiment, the axis of rotation 418 is on one edge of the of the evaporative media section 412 and adjacent to an evaporative media section 422 of the second set 420. However, any other suitable rotation axis 418 may be used, including for example the center of the evaporative media section 412 or even about an axis 418 that is in a horizontal plane (e.g., 90 degrees from the axis 418 shown in FIG. 9). Other rotation axes may require altering the geometry of the evaporative media sections 412 from the cuboid structure depicted in FIG. 9. Moving the evaporative media sections 412 in direction F from the closed position exposes a portion of the openings 426 in the second set 420, allowing bypass air 308 to flow through the openings 426. Moving the evaporative media sections 412 in direction F further from the closed position will create larger gaps between the evaporative media sections 412 in the first set 410 and the evaporative media sections 422 in the second set 420, allowing a greater proportion of the input air 302 to flow through the openings 426 as bypass air 308. Conversely, moving the evaporative media sections 412 in direction G from an open position closes the openings 426 in the second set 420 and reduces the proportion of the input air 302 that will flow through the openings 426 as bypass air 308.

The movable evaporative media sections 412 may be mounted in any suitable manner, such as on rollers engaging a single track or double tracks. They may also be moved by any suitable movement devices including, for example, gears, motors, and actuators. Suitable movement devices include those driven manually, electrically, pneumatically, and hydraulically.

Preferably, the evaporative media sections 412, 422 and openings 416, 426 are arranged to promote mixing of the conditioned air 306 and bypass air 308. Good mixing in the system promotes homogeneity in the supply air 304 and avoids the problems such as stratification of air within the supply air 304. One arrangement that promotes mixing includes having a plurality of openings 416, 426 in both the first and second sets 410, 420 of evaporative media sections 412, 422. Preferably these openings 416, 426 are spaced throughout the width of the volume 314. As shown in FIGS. 3, 6, 8, and 9, an opening 412, 422 separates each evaporative media section 412, 422 from an adjacent evaporative media section 412, 422 in that set 410, 420 such that the openings 416, 426 alternate with evaporative media sections 412, 422.

Figure 10:
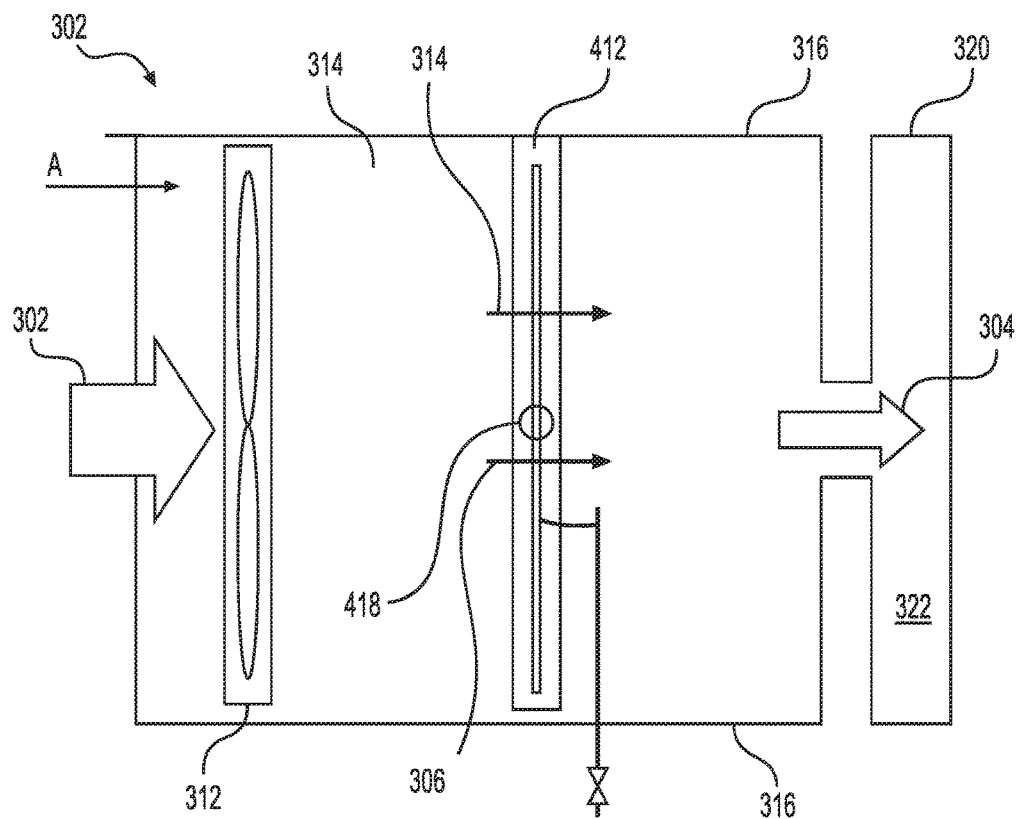
FIG. 10 is top plan view of an air handling system according to another preferred embodiment of the invention.
Figure 11:
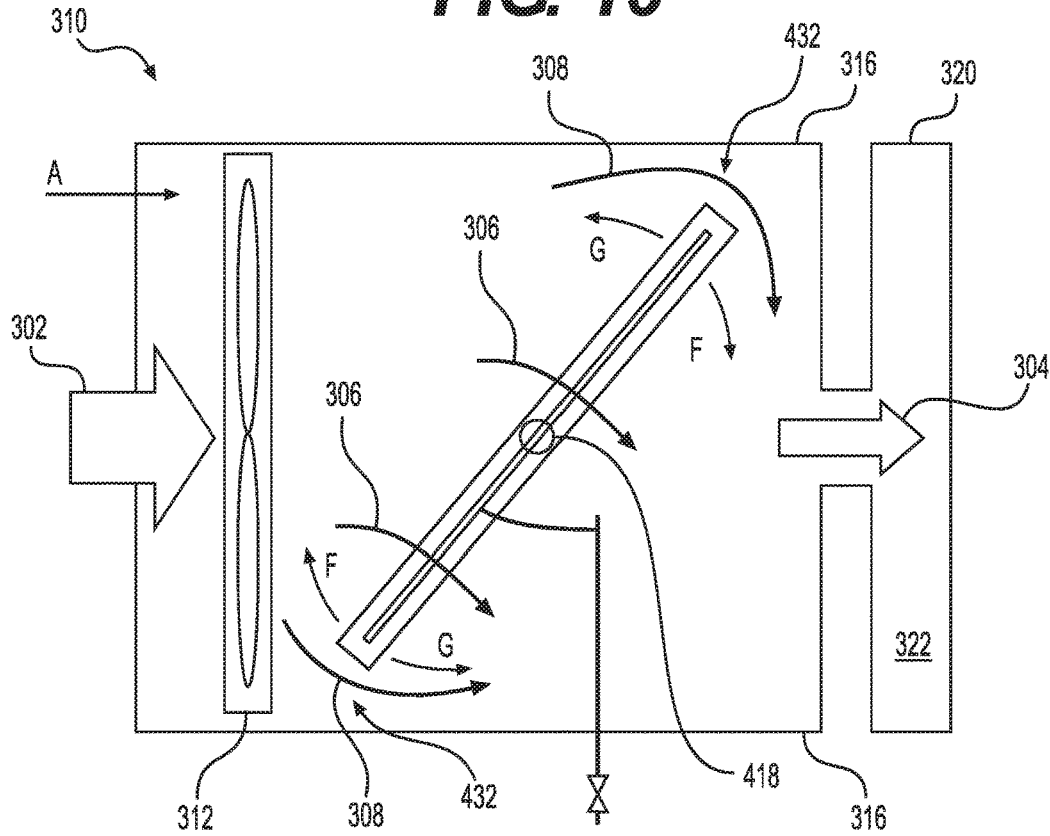
FIG. 11 shows the embodiment of the air handling system of FIG. 10 with the evaporative media section in an open position.

Another arrangement of the evaporative cooling system 400 that can be used in the air handling system 310 is shown in FIGS. 10 and 11. Instead of a plurality of evaporative media sections 412, 422 being used, a single movable evaporative media section 412 is positioned within the volume 314 in this embodiment. Although shown as a single evaporative media section 412, a plurality of cassettes 500 could be combined to move together as the movable evaporative media section 412. FIG. 10 shows the closed position of the evaporative media section 412. In the closed position, the evaporative media section 412 is transverse to the air flow direction A, and preferably the upstream face 504 of the evaporative media section 412 is perpendicular to the air flow direction A.

FIG. 11 shows an open position of the evaporative media section 412. In the configuration shown in FIGS. 10 and 11, the evaporative media section 412 rotates in directions F and G about the axis of rotation 418 to move between the closed position and an open position or between open positions. Here the axis of rotation 418 is in a vertical plane through the center of the evaporative media section 412, but as with the embodiment discussed above with reference to FIG. 9, any suitable rotation axis may be used. Instead of rotating, the movable evaporative media section 412 of this embodiment may be movable in any other suitable manner including, for example, by linearly translating as discussed above with reference to FIG. 6.

As with the embodiment shown in FIG. 9, moving the evaporative media section 412 in direction F from the closed position creates a bypass flow gap 432 between the evaporative media section 412 and the wall 316 on each side of the evaporative media section 412. The bypass flow gap 432 allows bypass air 308 to flow around the evaporative media section 412. Moving the evaporative media section 412 in direction F further from the closed position will create a larger bypass flow gap, allowing a greater proportion of the input air 302 to flow through the bypass flow gap 432 as bypass air 308. Conversely, moving the evaporative media sections 412 in direction G from an open position closes the bypass flow gap 432 and reduces the proportion of the input air 302 that will flow through the bypass flow gap 432 as bypass air 308.

Figure 12A:
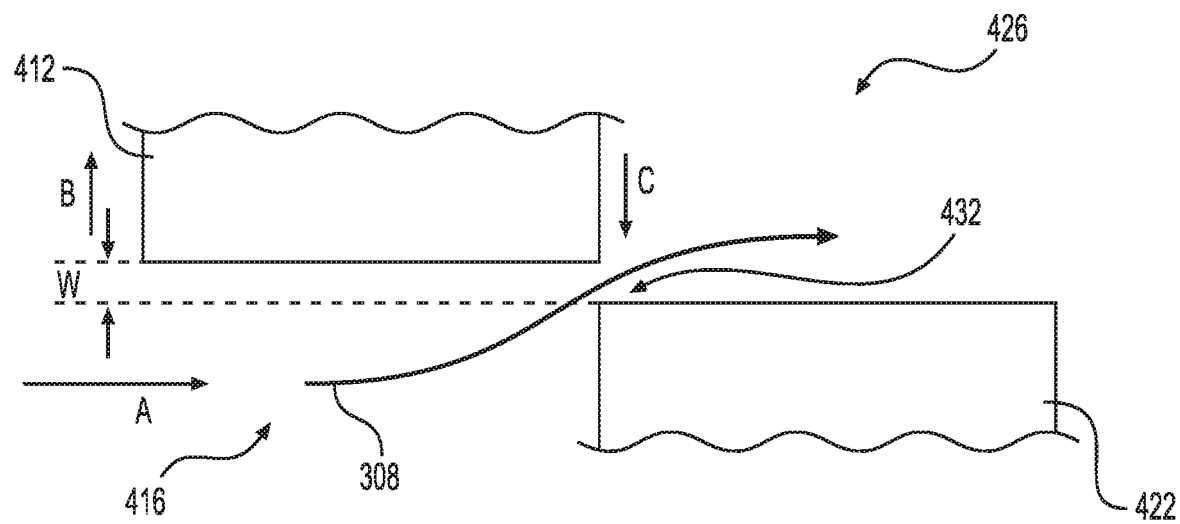
FIG. 12A is a top plan view of detail 12 in FIG. 3.
Figure 13A:
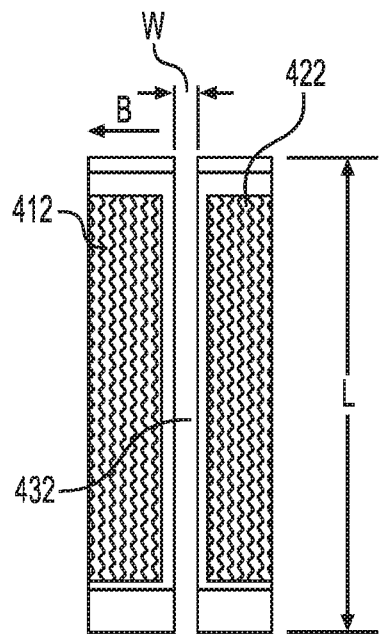
FIG. 13A is a front plan view of detail 12 in FIG. 3.

When the movable evaporative media sections 412 are opened a short distance, the amount of the opening 426 that is exposed (referred to herein as a bypass flow gap 432) is relatively narrow, but it extends the entire height of the evaporative media sections 412, 422 as shown in FIG. 13A. FIG. 12A is a schematic view (viewed from above) showing detail 12 in FIG. 3, and FIG. 13A is a view of detail 12 looking downstream at the upstream faces 504 of two adjacent evaporative media sections 412, 422. In FIGS. 12A and 13A, the movable evaporative media section 412 has been opened a short distance. This narrow, but tall bypass flow gap 432 allows a large amount of bypass air 308 to rush through the opening 426. This may be undesirable, and more precise control of flow of the bypass air 308 may be desired.

Figure 13B:
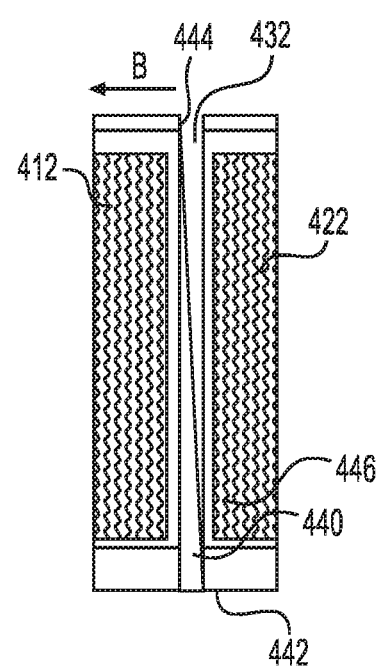
FIG. 13B is the view of FIG. 13A showing an edge seal.

An edge seal 440 may be used to control the area of the gap 432. In FIG. 13B, for example, an edge seal 440 is affixed to at least one of the adjacent evaporative media sections 412, 422. Although shown attached to the movable evaporative media section 412, the edge seal 440 may be attached to either evaporative media section 412 or 422. An edge seal 440 may also be used at the opening between the movable evaporative media section 412 and the adjacent wall 316. The edge seal 440 is provided with a geometry that controls the area of the bypass flow gap 432 as the media section begins to open or approaches closing. The edge seal 440 geometry controls the area by limiting at least one of the length L and width W of the bypass flow gap 432. Without an edge seal 440, there is a maximum bypass flow gap area for a given open position that is defined by the length L and width W of the bypass flow gap 432. The edge seal 440 limits the bypass flow gap area to a percentage of the maximum bypass flow gap area (less than 100 percent).

Figure 12B:
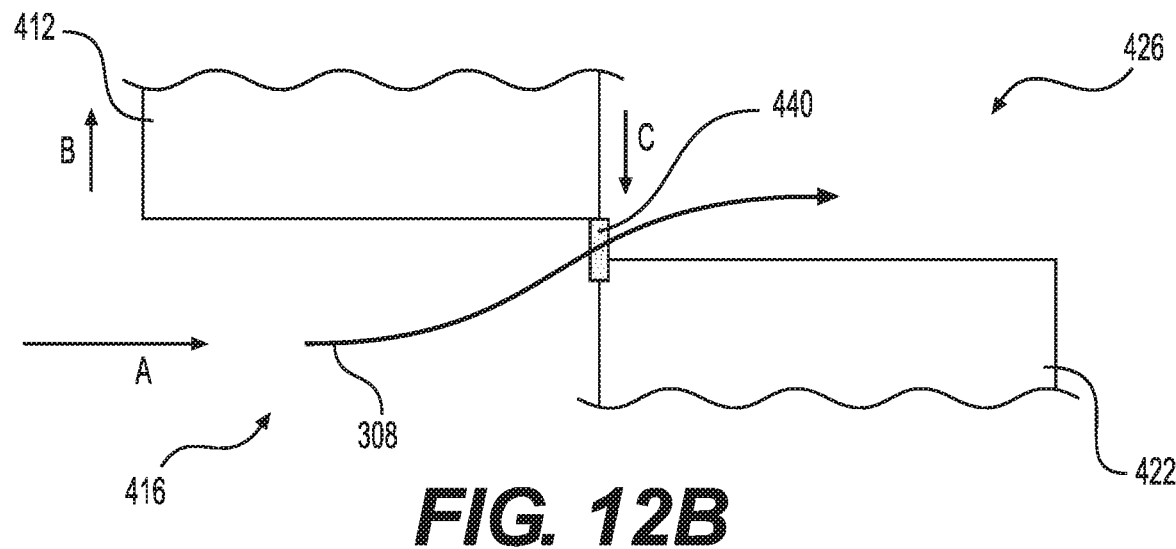
FIG. 12B is the view of FIG. 12A showing an edge seal.
Figure 13C:
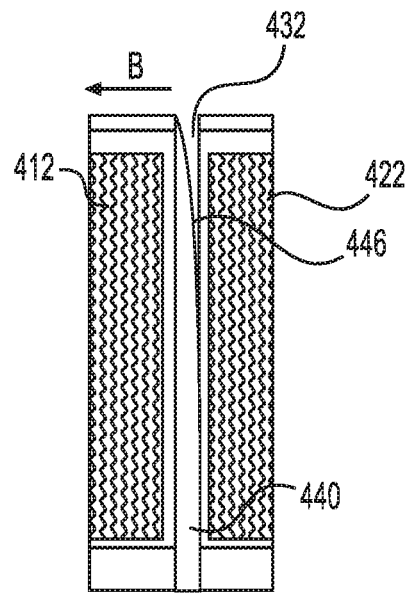
FIGS. 13C, 13D, 13E, and 13F are views of FIG. 13A showing alternative edge seals.
Figure 13D:
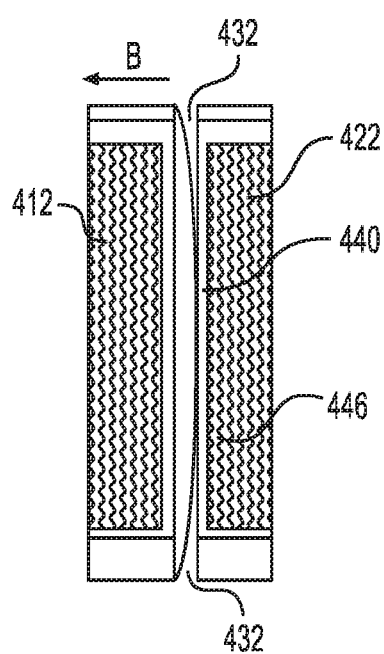
Figure 13E:
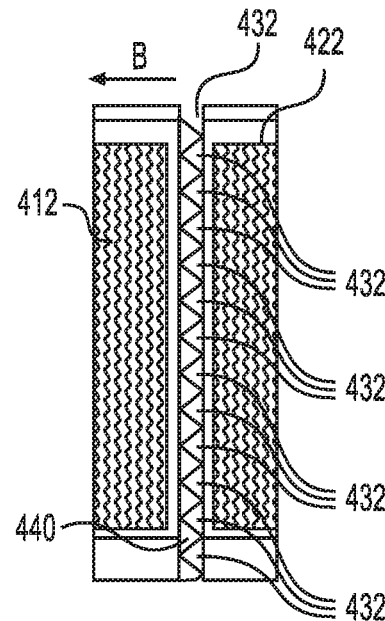
Figure 13F:
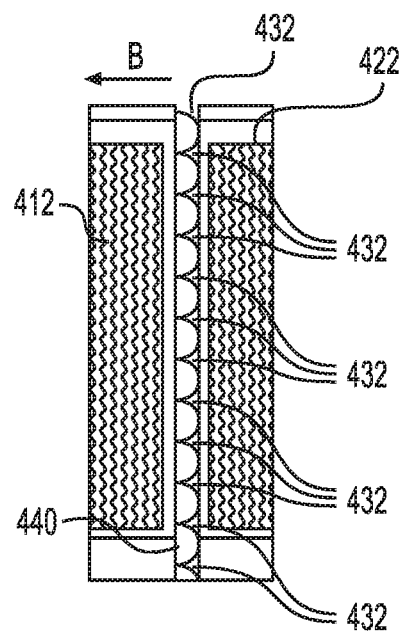

Any suitable geometry may be used for the edge seal 440. In FIG. 13B, for example, the edge seal has a triangular geometry. In the configuration shown in FIG. 13B, the bottom 442 of the edge seal 440 is wider than the top 444 and a regulating edge 446 linearly connects the top 444 and bottom 442. The edge seal 440 extends from the movable evaporative media section 412 and overlaps a portion of the adjacent evaporative media section 422 as can be seen in FIG. 12B. With this triangular geometry, the bypass flow gap 432 has a small area near the top between the evaporative media sections 412, 422. As the movable evaporative media section is moved in direction B, the area of the bypass flow gap 432 increases as the length L of the gap 432 increases. Other suitable geometries for the edge seal 440 include geometries where the regulating edge 446 is curved as shown in FIGS. 13C and 13D. In FIG. 13D the edge seal 440 is semi-ovular, having a gap 432 at both the top 444 and bottom 442. The edge seal 440 may also have multiple projections and openings over the height of the evaporative media sections 412, 422 such as the straight or rounded tooth patterns shown in FIGS. 13E and 13F, for example.

Figure 14:
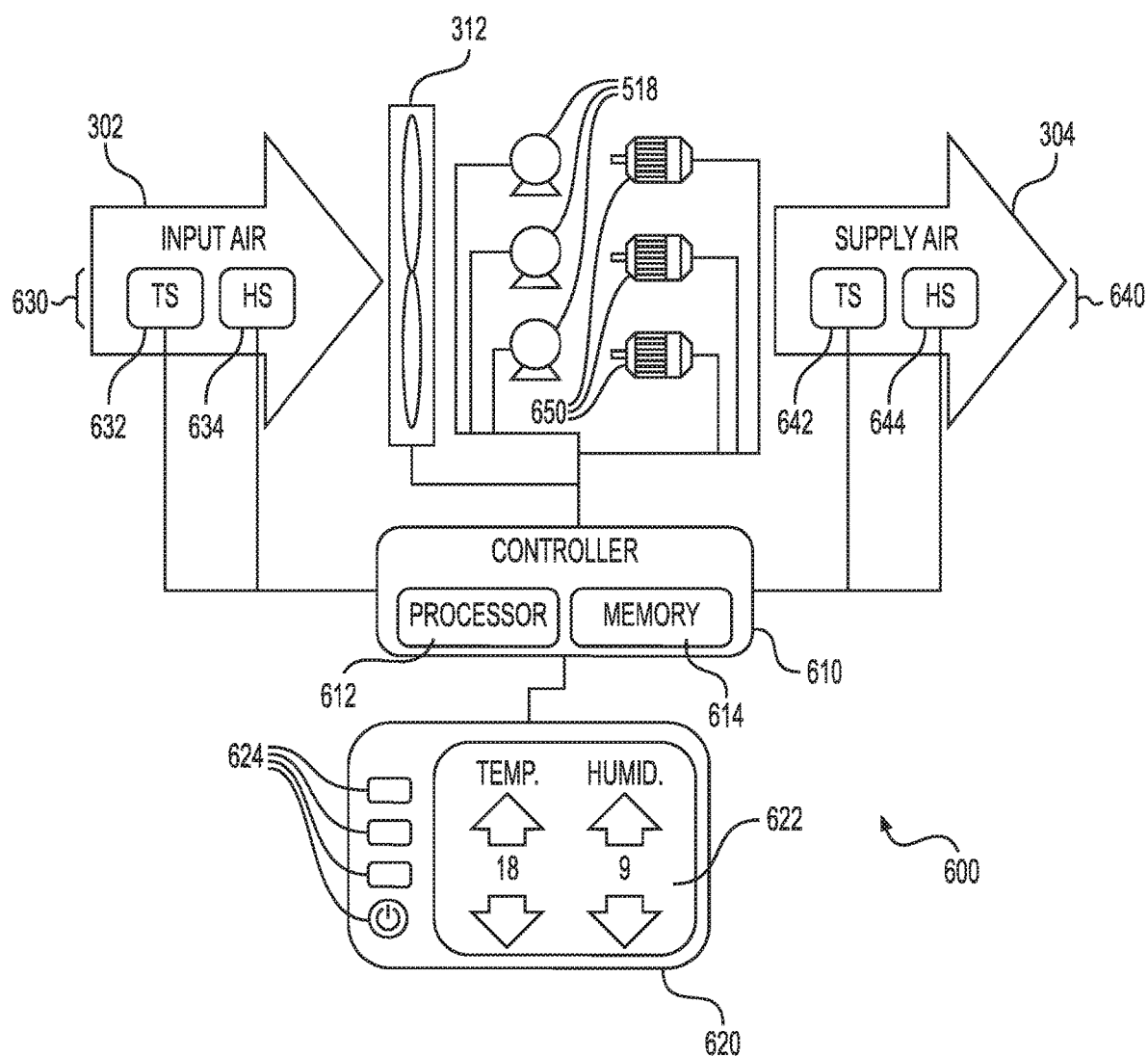
FIG. 14 is a schematic of a control system for the air handling system.

FIG. 14 is a schematic diagram of the control system 600 for the air handling system 310 shown in FIGS. 3, 6, 8, and 9. The control system 600 includes a controller 610; an input device 620; input air sensors 630, supply air sensors 640; fan 312; pumps 518 for each evaporative media section 412, 422; and movement devices 650 for each evaporative media section 412 in the first set 410. Although shown in FIG. 14 with pumps 518 for each evaporative media section 412, 422 and movement devices 650 for each movable evaporative media section 412, the invention is not so limited. For example, a single pump 518 could be used for all of the evaporative media sections 412, 422 in a set 410, 420 or valves could be used instead of multiple pumps 518. Also, a single movement device 650 could be used for all of the movable evaporative media sections 412, for example.

In this embodiment, the controller 610 is a microprocessor-based controller that includes a processor 612 for performing various functions discussed further below and a memory 614 for storing various data. The controller 610 may also be referred to as a CPU. In one embodiment, the control of the air handling system 310 may be implemented by way of a series of instructions stored in the memory 614 and executed by the processor 612.

The controller 610 is communicatively coupled to the input device 620. In this embodiment, the input device 620 includes a display screen 622, which may also be a touch screen suitable for receiving input from a user. In addition to or instead of a touch (display) screen 622, the input device 620 may include other suitable input devices such as static buttons 624 or a keyboard and mouse, for example. The display screen 622 may also display other operational parameters of the air handling system 310 such as the speed of the fan 312 and position of the evaporative media sections 412, for example.

Sensors 630, 640 located in the input air 302 stream and the supply air 304 stream may be used to measure various parameters of the input air 302 and supply air 304. For example, the input air sensors 630 may measure the temperature and humidity of the input air 302 using a temperature sensor ("TS") 632 and a humidity sensor ("HS") 634, respectively. Likewise, the supply air sensors 640 may measure the temperature and humidity of the supply air 304 using a temperature sensor ("TS") 642 and a humidity sensor ("HS") 644, respectively. The sensors 630, 640 are communicatively coupled to the controller 610, allowing the sensors 630, 640 to transmit (and the controller 610 to receive) the measured parameters of the input air 302 and supply air 304.

The fan 312 is also communicatively coupled to the controller 610, and the controller 610 may be used to adjust the operational parameters of the fan 312 including, for example, the speed of the fan 312.

The controller 610 may also be used to operate the individual evaporative media sections 412, 422 and the various components discussed above with reference to FIGS. 4 and 5. For example, the controller 610 may be communicatively coupled to the pump 518 for each evaporative media section 412 in the first set 410, and the controller 610 can turn on or off evaporative cooling of that evaporative media section 412 by turning on or off the pump 518, respectively.

As discussed above, any suitable movement device 650 may be used to move the evaporative media sections 412. The movement device 650 may be communicatively coupled to the controller 610. The controller 610 may adjust the position of each evaporative media section 412 by operating the movement device to move evaporative media section 412 in the opening direction (directions B, D, and F) or in the closing direction (directions C, E, and G).

The control system 600 may be used in various different ways to control the air handling system 310. Two approaches are described below with reference to FIGS. 15 and 16, respectively. The approach described with reference to FIG. 16, is a feedback control approach, which is, generally, the preferred approach for most applications of the air handling system 310.

Figure 15:
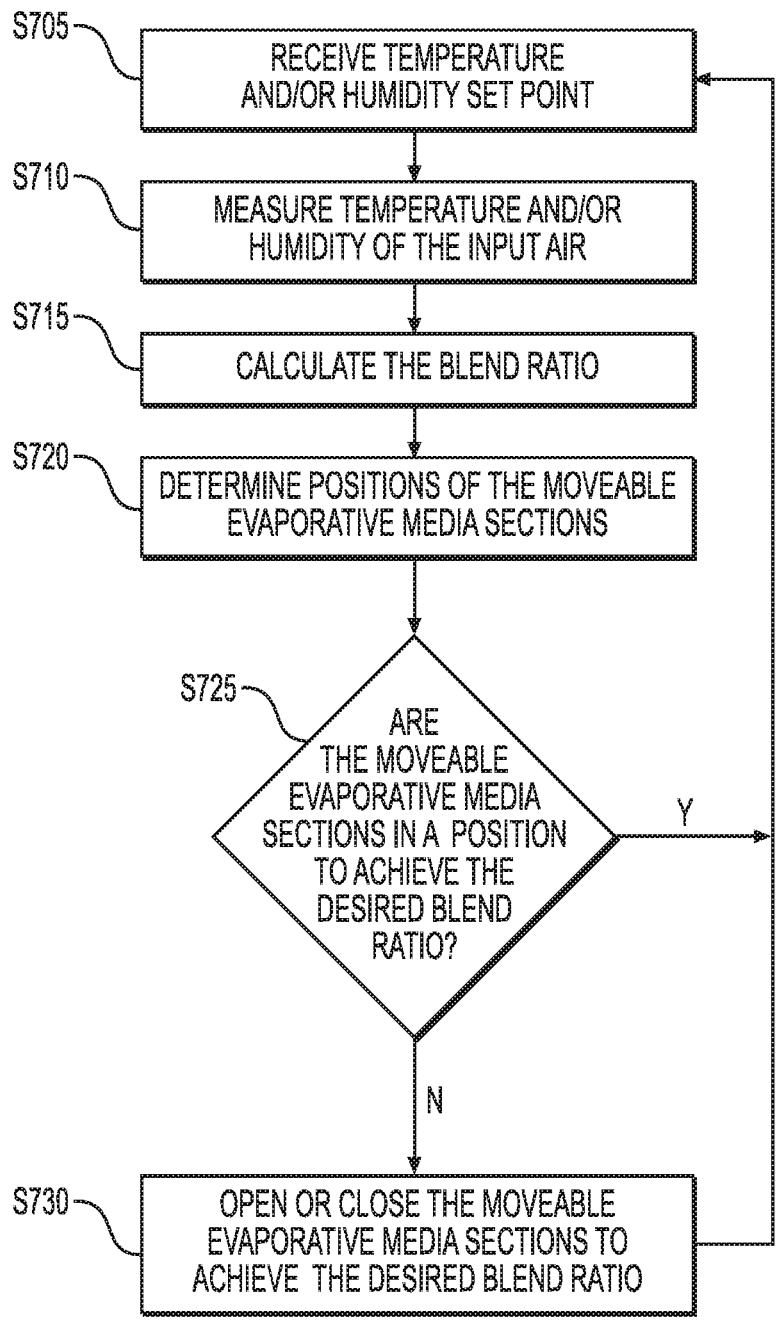
FIG. 15 is a flow chart depicting a method of controlling the air handling system.
Figure 16:
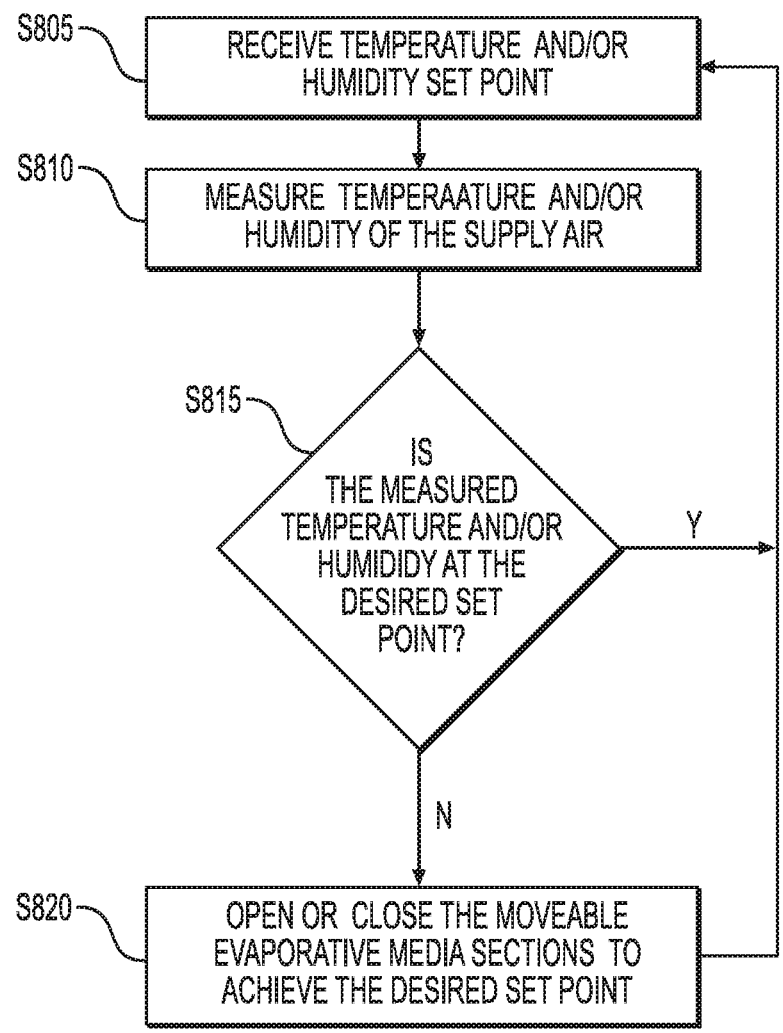
FIG. 16 is a flow chart depicting another method of controlling the air handling system.

As shown in FIG. 15, the controller 610 receives a set point indicating the desired condition for the supply air 304 in step S705. In this example, the desired condition is temperature and/or humidity of the supply air 304 (a predetermined temperature and/or humidity). As depicted in FIG. 14, a user may input a desired temperature and/or humidity for the supply air 304 by using arrows on the display screen 622. In other situations, the desired set point may be stored in the memory 614.

The input air sensors 630 are used to measure the current condition (environmental condition) of the input air 302, and the controller 610 receives that current condition in step S710. For example, the input air temperature sensor 632 measures the temperature of the input air 302 and the input air humidity sensor 634 measures the humidity of the input air 302. The controller 610 then calculates the blend ratio in step S715 to determine the relative amounts of bypass air 308 and conditioned air 306 necessary to achieve the desired set point. In step S720, the controller 610 then determines the position of the movable evaporative media sections 412 to achieve the desired blend ratio. Here, the blend ratio is based on the expected performance of the evaporative media sections 412, 422 and expected amount of flow through the openings 426 of bypass air 308 for a given speed of the fan 312. The number of evaporative media sections 412, 422 operating may also be determined in this step, and the controller 610 may turn on or off the pumps 518 or other operational aspects of the evaporative media sections 412, 422 to achieve the desired performance. This calculation and the calculation in step S715 may be performed by any suitable method including, for example, by the processor 612 performing calculations based on a formula stored in the memory 614, or by the processor 612 looking up predetermined positions of the evaporative media sections 412 in a look-up table or database based on the set point and measured conditions. Performance may also be impacted by the flow conditions of the input air 302, and the controller 610 may likewise adjust suitable parameters including, for example, the speed of the fan 312.

Once the desired position of the movable evaporative media sections 412 is determined, the controller 610 determines whether the movable evaporative media sections 412 are in the correct position in step S725. If they are in the correct position, the controller 610 returns to step S705 and repeats the process, monitoring for changes in the input air 302 or set point. If the movable evaporative media sections 412 are not in the correct position, the controller 610, in step S730, then operates the movement devices 650 to open or close at least one movable evaporative media section 412. The process is then repeated to monitor for changes in the input air 302 or set point.

In addition to or instead of using the input air 302, the supply air 304 may be used to determine the appropriate position of the movable evaporative media sections 412 as described with reference to FIG. 16. The controller 610 receives the set point in step S805, which is the same as step S705 discussed above. When supply air 304 is used to control the position of the evaporative media sections 412, the supply air sensors 640 are used to measure the current condition (environmental condition) of the supply air 304, and the controller 610 receives that current condition in step S810. For example, the supply air temperature sensor 642 measures the temperature of the supply air 304 and the supply air humidity sensor 644 measures the humidity of the supply air 304. The controller 610 then compares the measured temperature and/or humidity to the set point for those conditions in step S815. If the operational parameters are at the set point, the controller 610 returns to step S805 and repeats the process, monitoring for changes in the supply air 304 or set point. If the operational parameters are not at the set point, the controller 610, in step S820, then operates the movement devices 650 to open or close at least one movable evaporative media section 412 to achieve the desired condition of the supply air 304. The evaporative media section 412 may be moved a set amount in a direction and then the process repeated based on feedback from the supply air sensors 640 or the amount of movement may be determined by performing a calculation similar to those performed for the blend ratio discussed above in reference to steps S715 and S720. The process is then repeated to monitor for changes in the supply air 304 or set point. As with step S720, the controller 610 may change, in step S820, other operational aspects of the evaporative media sections 412, 422 or air handling system 310 (such as the speed of the fan 312) to achieve the desired performance.

The example embodiments discussed above show and describe all of the evaporative media sections 412 of the first set 410 moving in concert. However, each evaporative media section 412 may be moved individually or at different magnitudes, including moving some, but not all, of the evaporative media sections 412 in the first set 410. Although the evaporative media sections 412 of the first set 410 are depicted and described as moving, the evaporative media sections 422 of the second set 420 may be moved to allow the bypass air 308 to flow through the openings 416 in the first set 410. Alternatively, instead of moving the evaporative media sections 412, 422 from just one set 410, 420, both the evaporative media sections 412 of the first set 410 and the evaporative media sections 422 of the second set 420 may be moved.

Although this invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. An air handling system comprising:
    a movable evaporative media section movable between a closed position and an open position by rotation about a rotation axis, the movable evaporative media section including evaporative media and being configured to have water flow downwardly in a direction in which the rotation axis extends and over outer surfaces of the evaporative media from a water supply, air being capable of flowing through the portion of the air handling system containing the movable evaporative media section in an air flow direction; and
    a direct expansion refrigerant system including a condensing coil positioned downstream of the movable evaporative media section,
    wherein, when the movable evaporative media section is in the open position, the movable evaporative media section exposes an opening directly to the air flow and is positioned to allow at least a portion of the air flow to flow around the movable evaporative media section, through the opening, and to the condensing coil.

2. The air handling system of claim 1, wherein the movable evaporative media section has a plurality of open positions.

3. The air handling system of claim 1, further comprising a first evaporative media section having an upstream face, the first evaporative media section positioned with the upstream face of the first evaporative media section being transverse to the air flow direction,
    wherein the opening is adjacent to the first evaporative media section and configured to allow at least a portion of the air flow to flow around the first evaporative media section, and
    wherein the movable evaporative media section is a second evaporative media section.

4. The air handling system of claim 3, wherein, in the closed position, the second evaporative media section is positioned upstream of the opening and least a portion of the air flow flows through the second evaporative media section before flowing through the opening.

5. The air handling system of claim 3, wherein, in the closed position, the second evaporative media section is positioned downstream of the opening and least a portion of the air flow flows through the opening before flowing through the second evaporative media section.

6. The air handling system of claim 1, wherein, when the movable evaporative media section is in the open position, the portion of the air flow flowing around the movable evaporative media section and then through the opening flows through a bypass flow gap, the bypass flow gap having an area, the air handling system further comprising an edge seal (i) positioned in the bypass flow gap and (ii) having a geometry that limits the area of the bypass flow gap to a percentage of a maximum flow gap area that is less than 100 percent of the maximum flow gap area, the maximum flow gap area being defined by the height of the movable evaporative media section and the distance from the open position to the closed position.

7. The air handling system of claim 1, wherein the movable evaporative media section has a plurality of open positions and the air handling system further comprises:
 a movement device configured to move the movable evaporative media section between the closed position and the plurality of open positions; and
 a controller configured to operate the movement device to move the movable evaporative media section between the closed position and the plurality of open positions.

8. An air handling system comprising:
 a plurality of movable evaporative media sections, each movable evaporative media section including evaporative media and being configured to have water flow over outer surfaces of the evaporative media from a water supply in a water flow direction, air being capable of flowing through the portion of the air handling system containing the plurality of movable evaporative media section in an air flow direction, the plurality of movable evaporative media sections being aligned in a direction that is transverse to the air flow direction and transverse to the water flow direction; and
 a direct expansion refrigerant system including a condensing coil positioned downstream of the plurality of movable evaporative media sections,
 wherein, in an open position, each movable evaporative media section of the plurality of movable evaporative media sections exposes an opening directly to the air flow and is positioned to allow at least a portion of the air flow to flow around the movable evaporative media section, through the opening, and to the condensing coil.

9. The air handling system of claim 8, wherein the plurality of moveable evaporative media sections are a first set of evaporative media sections, and the air handling system further comprises a plurality of evaporative media sections in a second set of evaporative media sections, the evaporative media sections in the second set of evaporative media sections being aligned in a direction that is transverse to the air flow direction, the opening exposed when each movable evaporative media section is in the open position being next to one of the plurality of evaporative media sections in the second set.

10. An air handling system comprising:
 a movable evaporative media section movable between a closed position and an open position by linear translation, the movable evaporative media section including evaporative media and being configured to have water flow downwardly over outer surfaces of the evaporative media from a water supply, air being capable of flowing through the portion of the air handling system containing the movable evaporative media section in an air flow direction; and
 a direct expansion refrigerant system including a condensing coil positioned downstream of the movable evaporative media section,
 wherein, when the movable evaporative media section is in the open position, the movable evaporative media section exposes an opening directly to the air flow and is positioned to allow at least a portion of the air flow to flow around the movable evaporative media section, through the opening, and to the condensing coil.

11. The air handling system of claim 10, wherein the movable evaporative media section linearly translates in directions that are transverse to the air flow direction.

12. The air handling system of claim 10, wherein the movable evaporative media section linearly translates in directions that are upstream and downstream with respect to the air flow direction.

13. The air handling system of claim 10, wherein the movable evaporative media section has a plurality of open positions.

14. The air handling system of claim 10, further comprising a first evaporative media section having an upstream face, the first evaporative media section positioned with the upstream face of the first evaporative media section being transverse to the air flow direction,
 wherein the opening is adjacent to the first evaporative media section and configured to allow at least a portion of the air flow to flow around the first evaporative media section, and
 wherein the movable evaporative media section is a second evaporative media section.

15. The air handling system of claim 14, wherein, in the closed position, the second evaporative media section is positioned upstream of the opening and least a portion of the air flow flows through the second evaporative media section before flowing through the opening.

16. The air handling system of claim 14, wherein, in the closed position, the second evaporative media section is positioned downstream of the opening and least a portion of the air flow flows through the opening before flowing through the second evaporative media section.

17. The air handling system of claim 10, wherein, when the movable evaporative media section is in the open position, the portion of the air flow flowing around the movable evaporative media section and then through the opening flows through a bypass flow gap, the bypass flow gap having an area, the air handling system further comprising an edge seal (i) positioned in the bypass flow gap and (ii) having a geometry that limits the area of the bypass flow gap to a percentage of a maximum flow gap area that is less than 100 percent of the maximum flow gap area, the maximum flow gap area being defined by the height of the movable evaporative media section and the distance from the open position to the closed position.

18. The air handling system of claim 10, wherein the movable evaporative media section has a plurality of open positions and the air handling system further comprises:
 a movement device configured to move the movable evaporative media section between the closed position and the plurality of open positions; and
 a controller configured to operate the movement device to move the movable evaporative media section between the closed position and the plurality of open positions.

\* \* \* \* \*